US011182394B2

(12) United States Patent
Jagwani et al.

(10) Patent No.: US 11,182,394 B2
(45) Date of Patent: Nov. 23, 2021

(54) PERFORMING DATABASE FILE MANAGEMENT USING STATISTICS MAINTENANCE AND COLUMN SIMILARITY

(71) Applicant: Bank of America Corporation, Charlotte, NC (US)

(72) Inventors: Satish Jagwani, Charlotte, NC (US); Dhaval Shah, Pune (IN); Raghuram Neela, Charlotte, NC (US); Seyamak Amin, Frisco, TX (US); Ryan M. Greenway, Charlotte, NC (US); Anupam Kumar Singh, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 753 days.

(21) Appl. No.: 15/797,925

(22) Filed: Oct. 30, 2017

(65) Prior Publication Data
US 2019/0129959 A1    May 2, 2019

(51) Int. Cl.
*G06F 16/2457* (2019.01)
*G06F 3/06* (2006.01)
(Continued)

(52) U.S. Cl.
CPC ...... *G06F 16/24578* (2019.01); *G06F 3/0643* (2013.01); *G06F 16/1727* (2019.01);
(Continued)

(58) Field of Classification Search
CPC combination set(s) only.
See application file for complete search history.

(56) References Cited

U.S. PATENT DOCUMENTS 5,893,078 A    4/1999   Paulson
6,091,846 A    7/2000   Lin et al.
(Continued)

FOREIGN PATENT DOCUMENTS

CA    2953969 A1 *  1/2016  .......... G06F 9/5066
CN    102855170 A     1/2013
(Continued)

OTHER PUBLICATIONS

JPO Machine Translation of Shimizu (Aug. 2008).*
(Continued)

*Primary Examiner* — Apu M Mofiz
*Assistant Examiner* — Farhad Agharahimi
(74) *Attorney, Agent, or Firm* — Banner & Witcoff, Ltd.; Michael A. Springs

(57) ABSTRACT

A computing platform may perform computer database file management by implementing statistics maintenance and column similarity. The computing platform may receive an input table and determine a data type for the received input table. The computing platform may determine statistics relevant to the input table, and statistics relevant to historical tables of the data type. Statistics may include overlap, distribution, mean, standard deviation, percentile, median, and the like. Based on the determined statistics, the computing platform may determine a similarity score between the input table and the historical tables. Based on the statistics and column similarity, the computing platform may perform database file management, such as storing records, updating records, identifying data anomalies, sending alerts related to identified data anomalies, moving records, tagging records, and the like. The computing platform may send alerts related to identified data anomalies to remote devices.

20 Claims, 15 Drawing Sheets

(51) Int. Cl.
  *G06F 16/22* (2019.01)
  *G06F 16/17* (2019.01)
  *G06F 16/18* (2019.01)
  *G06F 16/21* (2019.01)

(52) U.S. Cl.
  CPC ........ *G06F 16/1873* (2019.01); *G06F 16/217* (2019.01); *G06F 16/221* (2019.01)

(56) References Cited

U.S. PATENT DOCUMENTS

| | | |
|---|---|---|
| 6,408,406 B1 | 6/2002 | Parris |
| 6,483,938 B1 | 11/2002 | Hennessey et al. |
| 6,629,095 B1 | 9/2003 | Wagstaff et al. |
| 8,572,107 B2 | 10/2013 | Fan et al. |
| 8,949,166 B2 | 2/2015 | Nelke et al. |
| 9,092,468 B2 | 7/2015 | Nelke et al. |
| 9,465,825 B2 | 10/2016 | Nelke et al. |
| 2002/0038308 A1 | 3/2002 | Cappi |
| 2003/0187864 A1 | 10/2003 | McGoveran |
| 2004/0024790 A1 | 2/2004 | Everett |
| 2005/0060342 A1 | 3/2005 | Farag |
| 2005/0209876 A1 | 9/2005 | Kennis et al. |
| 2006/0004753 A1 | 1/2006 | Coifman et al. |
| 2006/0136462 A1 | 6/2006 | Campos et al. |
| 2006/0161592 A1* | 7/2006 | Ertoz .................... G06F 21/552 |
| 2007/0276823 A1 | 11/2007 | Borden et al. |
| 2008/0140602 A1 | 6/2008 | Roth et al. |
| 2009/0006282 A1 | 1/2009 | Roth et al. |
| 2009/0089630 A1 | 4/2009 | Goldenberg et al. |
| 2010/0030544 A1* | 2/2010 | Gopalan ............... H04L 47/127 |
| | | 703/13 |
| 2010/0056149 A1 | 3/2010 | Jubin et al. |
| 2010/0312769 A1 | 12/2010 | Bailey et al. |
| 2010/0318858 A1 | 12/2010 | Essawi et al. |
| 2011/0093467 A1 | 4/2011 | Sharp et al. |
| 2011/0238376 A1 | 9/2011 | Dang et al. |
| 2012/0102002 A1 | 4/2012 | Sathyanarayana et al. |
| 2012/0136221 A1* | 5/2012 | Killen ................. G06F 19/3418 |
| | | 600/300 |
| 2012/0150820 A1 | 6/2012 | Sankaranarayanan et al. |
| 2013/0006931 A1 | 1/2013 | Nelke et al. |
| 2013/0091094 A1 | 4/2013 | Nelke et al. |
| 2013/0340052 A1 | 12/2013 | Jakobsson |
| 2014/0074796 A1 | 3/2014 | Akoglu et al. |
| 2014/0229456 A1 | 8/2014 | Hollifield et al. |
| 2014/0372482 A1 | 12/2014 | Martin et al. |
| 2014/0372602 A1* | 12/2014 | Fu ........................ H04L 43/0847 |
| | | 709/224 |
| 2015/0058280 A1 | 2/2015 | Nelke et al. |
| 2017/0017705 A1 | 1/2017 | Nelke et al. |
| 2017/0364521 A1* | 12/2017 | Posse .................... H04L 67/306 |
| 2018/0183744 A1* | 6/2018 | Yu ......................... H04L 51/046 |
| 2019/0065298 A1* | 2/2019 | Leverich ............... G06F 11/079 |

FOREIGN PATENT DOCUMENTS

| | | |
|---|---|---|
| CN | 102855170 B | 4/2016 |
| DE | 102012210794 A1 | 2/2013 |
| EP | 0310781 B1 | 3/1993 |
| JP | 2005063332 A * | 3/2005 |
| JP | 2008181459 A * | 8/2008 |
| WO | 2013087250 A1 | 6/2013 |
| WO | 2014012839 A1 | 1/2014 |

OTHER PUBLICATIONS

JPO Machine Translation of Hoshiai (2005).*
JPO Machine Translation of Shimizu (Aug. 2008) (Year: 2008).*
JPO Machine Translation of Hoshiai (2005) (Year: 2005).*
Informatica Profile Guide, pp. 1-95, <https://kb.informatica.com/proddocs/Product%20Documentation/5/IN_101_ProfileGuide_en.pdf>.
Mazda A. Marvasti, Arnak V. Poghosyan, Ashot N. Harutyunyan, Naira M. Grigoryan, VMware Technical Journal, Summer 2014, Statistical Normalcy Determination Based on Data Categorization—VMware Tec, retrieved Oct. 31, 2017 from <https://labs.vmware.com/vmtj/statistical-normalcy-determination-based-on-data-categorization>.
Profiling Data (Column Statistics), May 4, 2012, <https://www.ibm.com/support/knowledgecenter/en/SSC6AW_4.6.1/com.ibm.swg.im.disc.user.doc/topics/profil-data-col-stats.html?view=embed>.
Laura Sebastian-Coleman, Measuring Data Quality for Ongoing Improvement: A Data Quality Assessment, copyright 2013, <https://books.google.com/books?id=6hczObr0_WwC&pg=PA100&lpg=PA100&dq=data+quality+monitoring+column+statistics+baseline&source=bl&ots=m-0Rt-oO9F&sig=mgUZEAP-ooU47QHpdyS6Bbk3GOY&hl=en&sa=X&ved=0ahUKEwjmhoumsKfUAhWGQCYKHcJOAGkQ6AEITDAG>.
Nube Technologies, retrieved Oct. 31, 2017, <http://nubetech.co/>.
"Applying Machine Learning techniques for scaling out data quality algorithms in cloud computing environments," Sep. 2016, vol. 45, Issue 2, pp. 530-548, <http://link.springer.com/article/10.1007/s10489-016-0774-2>.
"Machine learning for automatic data quality assessment", retrieved Oct. 31, 2017,<http://apcwebold.in2p3.fr/APC_CS/en/activites/virgo/machine-learning-automatic-data-quality-assessment>.
David Issac, Chistopher Lynnes, Automated Data Quality Assessment in the Intellegent Archive, pp. 1-17, <https://disc.sci.gsfc.nasa.gov/intelligent_archive/presentations/AutoQualityAssessment.pdf>.
Sean Kandel, Ravi Parikh, Andreas Paepcke, Profiler: Integrated Statistical Analysis and Visualization for Data Quality Assessment, Advanced Visual Interfaces, 2012, retrieved Oct. 31, 2017 <http://vis.stanford.edu/papers/profiler>.
GitHub, Inc., <https://github.com/StanfordHCI/profiler>.
Sean Kandel, Ravi Parikh, Andreas Paepcke, Joseph M. Hellerstein, Jeffrey Heer, Profiler: Integrated Statistical Analysis and Visualization for Data Quality Assessment, retrieved Oct. 31, 2017, <http://vis.stanford.edu/files/2012-Profiler-AVI.pdf>.
National Science Foundation, DC: Medium Collaborative Research: Data Intensive Computing: Scalable, Social Data Analysis, retrieved Oct. 31, 2017, <https://www.nsf.gov/awardsearch/showAward?AWD_ID=0963922>.
IBM Knowledge Center, Data profiling and analysis, Oct. 1, 2011, <https://www.ibm.com/support/knowledgecenter/en/SSZJPZ_8.7.0/com.ibm.swg.im.iis.productization.iisinfsv.overview.doc/topics/cisoiausingprofile.html>.
IBM Knowledge Center, Features of IBM InfoSphere Discovery, Nov. 9, 2012, <https://www.ibm.com/support/knowledgecenter/en/SSC6AW_4.6.2/com.ibm.swg.im.disc.user.doc/topics/disc-enterp-ed.html>.
Features of IBM InfoSphere Discovery, Nov. 9, 2012, <https://www.ibm.com/support/knowledgecenter/en/SSC6AW_4.6.2/com.ibm.swg.im.disc.user.doc/topics/disc-enterp-ed.html?view=embed>.
IBM Cross-system data analysis, Nov. 9, 2012, <https://www.ibm.com/support/knowledgecenter/en/SSC6AW_4.6.2/com.ibm.swg.im.disc.user.doc/topics/x-sys-data-anal.html?view=embed>.
IBM Overview, May 4, 2012, <https://www.ibm.com/support/knowledgecenter/en/SSC6AW_4.6.1/com.ibm.swg.im.disc.user.doc/topics/overview-5.html?view=embed>.
IBM Knowledge Center Data monitoring and trending, Oct. 1, 2011, <https://www.ibm.com/support/knowledgecenter/en/SSZJPZ_8.7.0/com.ibm.swg.im.iis.productization.iisinfsv.overview.doc/topics/cisoiausingmonitor.html>.
IBM InfoSphere Foundation Tools, InfoSphere Information Analyzer capabilities, Oct. 1, 2011, <https://www.ibm.com/support/knowledgecenter/en/SSZJPZ_8.7.0/com.ibm.swg.im.iis.productization.iisinfsv.overview.doc/topics/cisoiaintro.html?view=embed>.
DataSource Consulting, retrieved Nov. 1, 2017,<http://ds.datasourceconsulting.com/blog/data-profiling-idq/>.
IBM Data profiling and analysis, Oct. 1, 2011, <https://www.ibm.com/support/knowledgecenter/en/SSZJPZ_8.7.0/com.ibm.swg.im.iis.productization.iisinfsv.overview.doc/topics/cisoiausingprofile.html?view=embed>.

(56) References Cited

OTHER PUBLICATIONS

IBM InfoSphere Information Analyzer tasks, Oct. 1, 2011, <https://www.ibm.com/support/knowledgecenter/en/SSZJPZ_8.7.0/com.ibm.swg.im.iis.productization.iisinfsv.overview.doc/topics/cisoiausing.html?view=embed>.

IBM Data monitoring and trending, Oct. 1, 2011, <https://www.ibm.com/support/knowledgecenter/en/SSZJPZ_8.7.0/com.ibm.swg.im.iis.productization.iisinfsv.overview.doc/topics/cisoiausingmonitor.html?view=embed>.

Informatica Data Quality Scorecard, Mar. 30, 2016, <https://marketplace.informatica.com/mpresources/docs/An%20automated%20solution%20for%20the%20reporting%20of%20Data%20Quality%20validations%20through%20Profiling.pdf>.

Oracle Data Quality Management, <https://docs.oracle.com/cd/E11882_01/owb.112/e10581/dataquality.htm>.

Mark Rittman, Oracle Data Profiling and Automated Cleansing Using Oracle Warehouse Builder 10g Release 2, <https://docs.oracle.com/cd/E11882_01/owb.112/e10581/dataquality.htm>.

Quadient Documentation for DataCleaner, <https://datacleaner.org/docs>.

* cited by examiner

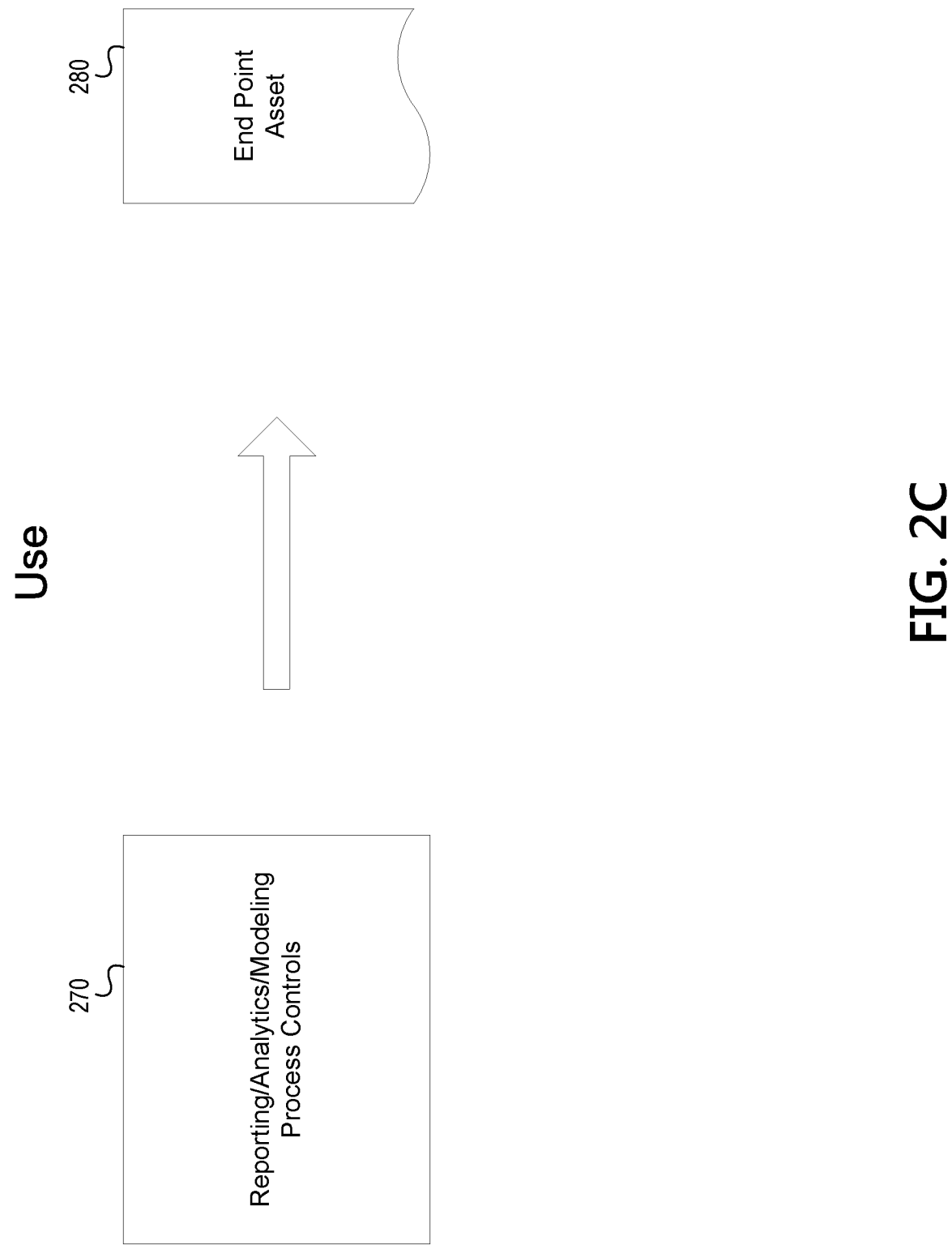

Transformation Analysis

Analysis on transformation activity and categorize

1. Enrichment
2. Granularity
3. Filtering
4. Derivation
5. ...

Categorical Variable

705 — Source Column

| Source Column |
|---|
| AA |
| BB |
| CC |
| DD |
| EE |
| FF |

710 — Target Column

| Target Column |
|---|
| BB |
| CC |
| EE |
| GG |
| HH |
| AA |

715 — Total Distinct

| Total Distinct |
|---|
| AA |
| BB |
| CC |
| EE |
| DD |
| FF |
| HH |

720, 725, 730

| Overlap | Unique to Source | Unique to Target |
|---|---|---|
| AA | DD | GG |
| BB | FF | HH |
| CC | | |
| EE | | |

|  | Target | | Source | | | |
|---|---|---|---|---|---|---|
| Distinct Obs. | # of recs. | % distribution | # of recs. | % distribution | Weight of Evidence | IV |
| AA | ##1 | %%1 | ##5 | %%5 | Weight1 | IV1 |
| BB | ##2 | %%2 | ##6 | %%6 | Weight2 | IV2 |
| CC | ##3 | %%3 | ##7 | %%7 | Weight3 | IV3 |
| EE | ##4 | %%4 | ##8 | %%8 | Weight4 | IV4 |
|  |  |  |  |  |  | DeterminedIV |

Numeric Non-Categorical Variable

| Metric | Target | Source |
|---|---|---|
|  | Target1 | Source1 |
| Column Name Similarity Score |  | Num1 |
| Mean | Num2 | Num3 |
| Mean Score |  | Num4 |
| Standard Deviation | Num5 | Num6 |
| Standard Deviation Score |  | Num7 |
| 5 Percentile | Num8 | Num9 |
| 5 Percentile Score |  | Num10 |
| 95 Percentile | Num11 | Num12 |
| 95 Percentile Score |  | Num13 |
| 25 Percentile | Num14 | Num15 |
| 75 Percentile | Num16 | Num17 |
| Median | Num18 | Num19 |
| Interquartile Range Score |  | Num20 |

Total Similarity Score = WeightFactor1 * Num1 + WeightFactor2 * Num4 + WeightFactor3 * Num7 + WeightFactor4 * Num10 + WeightFactor5 * Num13 + WeightFactor6 * Num20

TotalScore1

FIG. 7B

ALERT!

The city and state stored in your user profile have an anomaly.
City: City1
State: State1

Please update the city and state stored in your user profile.

| Go to my user profile | Remind me later |

FIG. 8A

ALERT!

Column1 of DataSet1 has an anomaly.

| Go to Column1 of DataSet1 | Remind me later |

FIG. 8B

PERFORMING DATABASE FILE MANAGEMENT USING STATISTICS MAINTENANCE AND COLUMN SIMILARITY

BACKGROUND

Aspects of the disclosure relate to computer hardware and software. In particular, one or more aspects of the disclosure generally relate to computer hardware and software for performing database file management using statistics maintenance and column similarity.

Businesses, organizations, and consumers increasingly deal with vast amounts of digital information, and therefore maintaining that digital information is also increasingly important. Companies and individuals have various methods of maintaining information. Thus, there will always be a need to make the computerized database file-management process easier and more efficient.

SUMMARY

Aspects of the disclosure provide effective, efficient, scalable, and convenient technical solutions that address and overcome the technical problems associated with computer database file management by implementing statistics maintenance and column similarity. Additional aspects of the disclosure relate to various systems and techniques that provide effective, efficient, scalable, and convenient ways of processing one or more columns of data from a database for use in identifying and correcting anomalies or errors in the database.

In accordance with one or more embodiments, a computing platform having at least one processor, a memory, and a communication interface may establish a communication link with a database. While the communication link is established, the computing platform may receive, from the database, an input table. The computing platform may classify the received input table into a data type from a plurality of pre-defined data types. The computing platform may determine a first statistic for a column of the received input table. The computing platform may store the first statistic for the column of the received input table in a repository of statistics. The computing platform may compare the first statistic for the column of the received input table to a second statistic for a column of a historical table, the historical table having the data type from the plurality of pre-defined data types. The computing platform may, based on comparing the first statistic for the column of the received input table and the second statistic for the column of the historical table, generate a similarity score of the column of the received input table to the column of the historical table. The computing platform may determine whether the similarity score of the column of the received input table to the column of the historical table is within a threshold similarity score range. The computing platform may, based on determining that the similarity score of the column of the received input table to the column of the historical table is not within the threshold similarity score range: tag the received input table as having the similarity score of the column of the received input table to the column of the historical table that is not within the threshold similarity score range, and send, to a remote device, an alert that the received input table has the similarity score of the column of the received input table to the column of the historical table that is not within the threshold similarity score range.

In one or more embodiments, the computing platform may update the historical table having the data type from the plurality of pre-defined data types with new metrics determined from the first statistic for the column of the received input table. In one or more embodiments, the computing platform may determine a prediction interval for a metric corresponding to the column of the historical table.

In one or more embodiments, the computing platform may generate a first metric value for the first statistic for the column of the received input table. The computing platform may generate a second metric value for the second statistic for the column of the historical table. The computing platform may determine a position of the second metric value for the second statistic for the column of the historical table in a prediction interval for a metric corresponding to the column of the historical table. In one or more embodiments, the computing platform may perform time-series modeling to provide the prediction interval for the metric corresponding to the column of the historical table.

In one or more embodiments, the computing platform may determine a weighting factor for the first metric value for the first statistic for the column of the received input table. The computing platform may use the weighting factor to determine a table level similarity score of the column of the received input table to the column of the historical table. The computing platform may use the weighting factor to determine a column level similarity score of the column of the received input table to the column of the historical table.

In one or more embodiments, storing the first statistic for the column of the received input table in the repository of statistics may include storing the first statistic for the column of the received input table in the repository of statistics in a data format compatible with for asynchronous communication. In one or more embodiments, storing the first statistic for the column of the received input table in the repository of statistics in the data format compatible with for asynchronous communication may include storing the first statistic for the column of the received input table in the repository of statistics in JavaScript Object Notation (JSON) format.

In one or more embodiments, the plurality of pre-defined data types may include a date data type, an index data type, a character categorical data type, a character non-categorical data type, a numeric categorical data type, and a numeric non-categorical data type In one or more embodiments, generating the similarity score of the column of the received input table to the column of the historical table may include generating a table level similarity score of the column of the received input table to the column of the historical table. In one or more embodiments, generating the similarity score of the column of the received input table to the column of the historical table may include generating a column level similarity score of the column of the received input table to the column of the historical table.

In one or more embodiments, the computing platform may generate a report comprising health of the column of the received input table.

In one or more embodiments, the computing platform may receive location information for the remote device. The computing platform may, based on determining that the remote device is not in a first location, send, to a different remote device, the alert that the received input table has the similarity score of the column of the received input table to the column of the historical table that is not within the threshold similarity score range.

In one or more embodiments, the computing platform may determine a time corresponding to receiving the input table. The computing platform may, based on determining that the time corresponding to receiving the input table is not within a threshold range of time, send, to a different remote device, the alert that the received input table has the similarity score of the column of the received input table to the column of the historical table that is not within the threshold similarity score range.

In one or more embodiments, the alert that the received input table has the similarity score of the column of the received input table to the column of the historical table that is not within the threshold similarity score range may cause the remote device to display a graphical user interface comprising the alert that the received input table has the similarity score of the column of the received input table to the column of the historical table that is not within the threshold similarity score range.

In one or more embodiments, the computing platform may aggregate a plurality of column level similarity scores for the column of the received input table. The computing platform may, based on the aggregated plurality of column level similarity scores for the column of the received input table, determine a file level similarity score for the received input table to the historical table.

In one or more embodiments, the computing platform may determine, based on whether the similarity score of the column of the received input table to the column of the historical table is within the threshold similarity score range, a recommendation for aligning the column of the received input table with the column of the historical table.

In one or more embodiments, the computing platform may establish a historical baseline for the second statistic for the column of the historical table. Determining whether the similarity score of the column of the received input table to the column of the historical table is within the threshold similarity score range may include determining whether the similarity score of the column of the received input table to the column of the historical table is within the threshold similarity score range of the historical baseline for the second statistic for the column of the historical table.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 2C depicts an illustrative use portion of a data lifecycle in accordance with one or more example embodiments;

FIG. 3C depicts illustrative transformation analysis for performing database file management using statistics maintenance and column similarity in accordance with one or more example embodiments;

FIG. 7A depicts an illustrative categorical variable that may be used with database file management using statistics maintenance and column similarity in accordance with one or more example embodiments;

FIG. 7B depicts an illustrative numeric non-categorical variable that may be used with database file management using statistics maintenance and column similarity in accordance with one or more example embodiments;

FIG. 8A depicts an illustrative graphical user interface for a user alert of anomalous data based on database file management using statistics maintenance and column similarity in accordance with one or more example embodiments; and FIG. 8B depicts an illustrative graphical user interface for an administrator alert of anomalous data based on performing database file management using statistics maintenance and column similarity in accordance with one or more example embodiments.

DETAILED DESCRIPTION

Figure 1A:
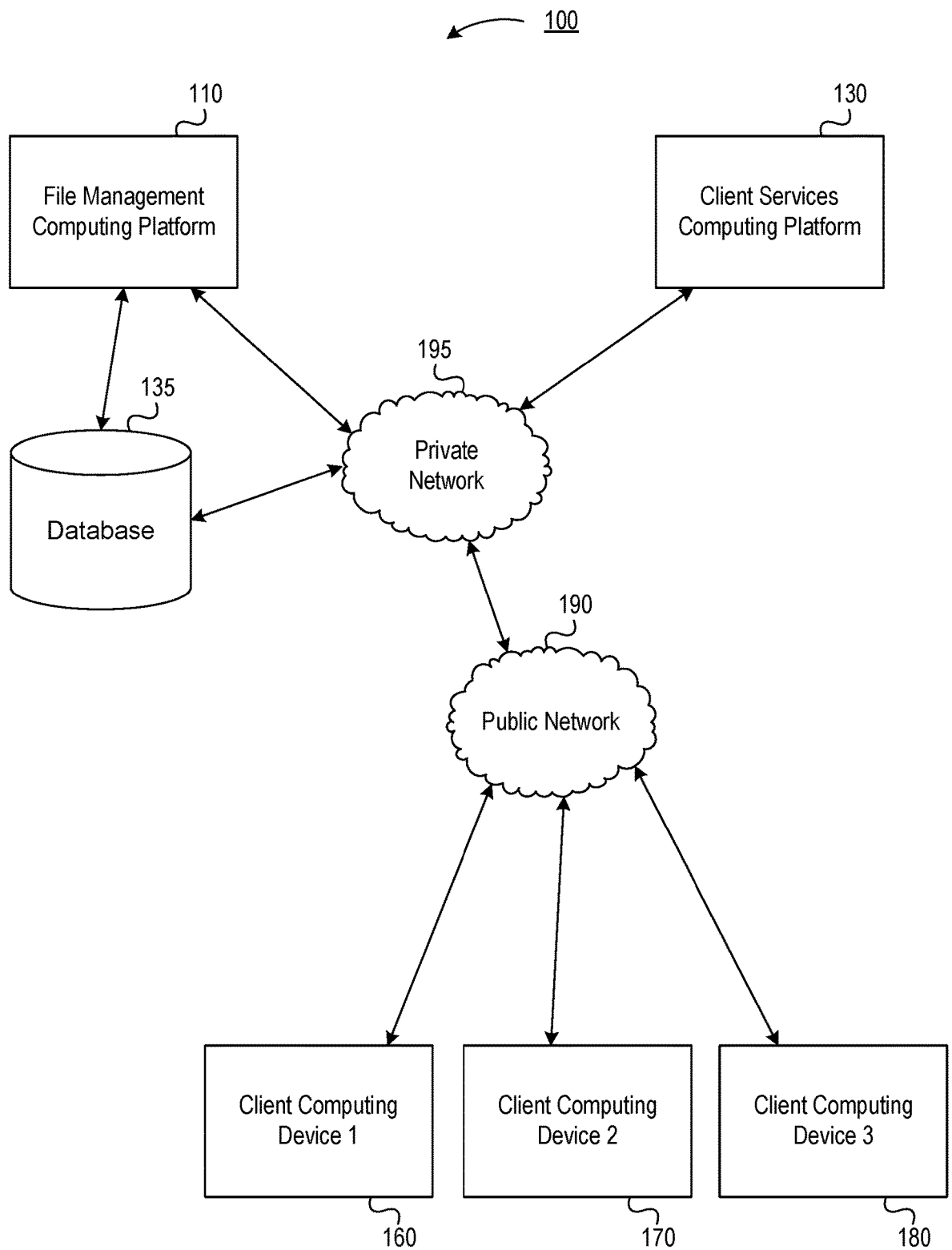
FIG. 1A depicts an illustrative computing environment for performing database file management using statistics maintenance and column similarity in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

In some database file management systems, controls for data accuracy may include basic, automated file-level checks by transport mechanisms and managed metrics that are manually set by data owners at points of transformation and/or aggregation and use. Maturity levels may vary for the accuracy controls, and there may be a lack of visibility and consistency across domains. Furthermore, the current controls might not be scalable and sustainable for the growth and complexity of the data ecosystem at an organization.

An opportunity exists to create a compensating, detective control in the form of full file accuracy testing that is scalable and sustainable. In some aspects, data accuracy controls may leverage the combination of two methods—the modeled monitoring of metrics and file-level profiling. These data accuracy controls may be scaled across one or more systems, and thereby provide automated data accuracy controls.

Modeled monitoring may be used for controlling the quality of data by trending the value of metrics over time and setting control limits for future runs of transformation and aggregation processes. These metrics may be limited to key metrics set manually by subject matter experts (SMEs) and might not be comprehensive to an entire data set.

Automated file-level profiling may extract metadata about files and/or feeds, which may be used to expose incorrect values or to compare the content across files. The metadata may uncover problems in the underlying data such as illegal or missing values, duplicates, and/or misspellings. Additionally, the comparison of the statistical metrics about the distribution of columns (e.g., min, median, mean, max, standard deviation, sum, or the like) may assess similarity for a set of files.

Thus, this disclosure may include, in one or more aspects, compensating, detective control in the form of full file accuracy testing that may be scalable and/or sustainable.

One or more aspects may include a system and method for automated, continuous or periodic, in-line data quality monitoring using column profile similarity over time. Column statistics may be compared at each interval to determine similarity (direct distance metric, or other measure of statistical similarity). The metrics (similarities) may be stored and analyzed over time to generate a time series prediction interval, which may be used to identify anomalous data. Anomalous data may be changes in similarity (metrics) that are outside of the prediction band.

In one or more aspects, data might not be moved or replicated. Data may sit on a native platform. A data analysis tool may be platform agnostic. The data analysis tool may be domain agnostic.

In one or more aspects, SME input might not be mandatory to set threshold limits. In one or more aspects, historical files may define the limits for future files. In one or more aspects, a system might not define which column is of importance. One or more or all columns may be monitored. In one or more aspects, a flexible framework may be used to introduce new statistics and/or metrics, which may be monitored for one or more files.

One or more aspects may include comparing column profiles over time, and/or using these values to develop a time series model for predicting the acceptable band of metrics for subsequent measurements. The metrics may be measures of statistical similarity that vary from data type to data type and object type (e.g., columns versus tables). The process of generating the prediction intervals over time may be a useful way of automating and scaling data quality monitoring processes.

One or more aspects may use time series modeling to help dynamically determine thresholds for periodic and trending data, and may encompass column profiling.

Figure 1B:
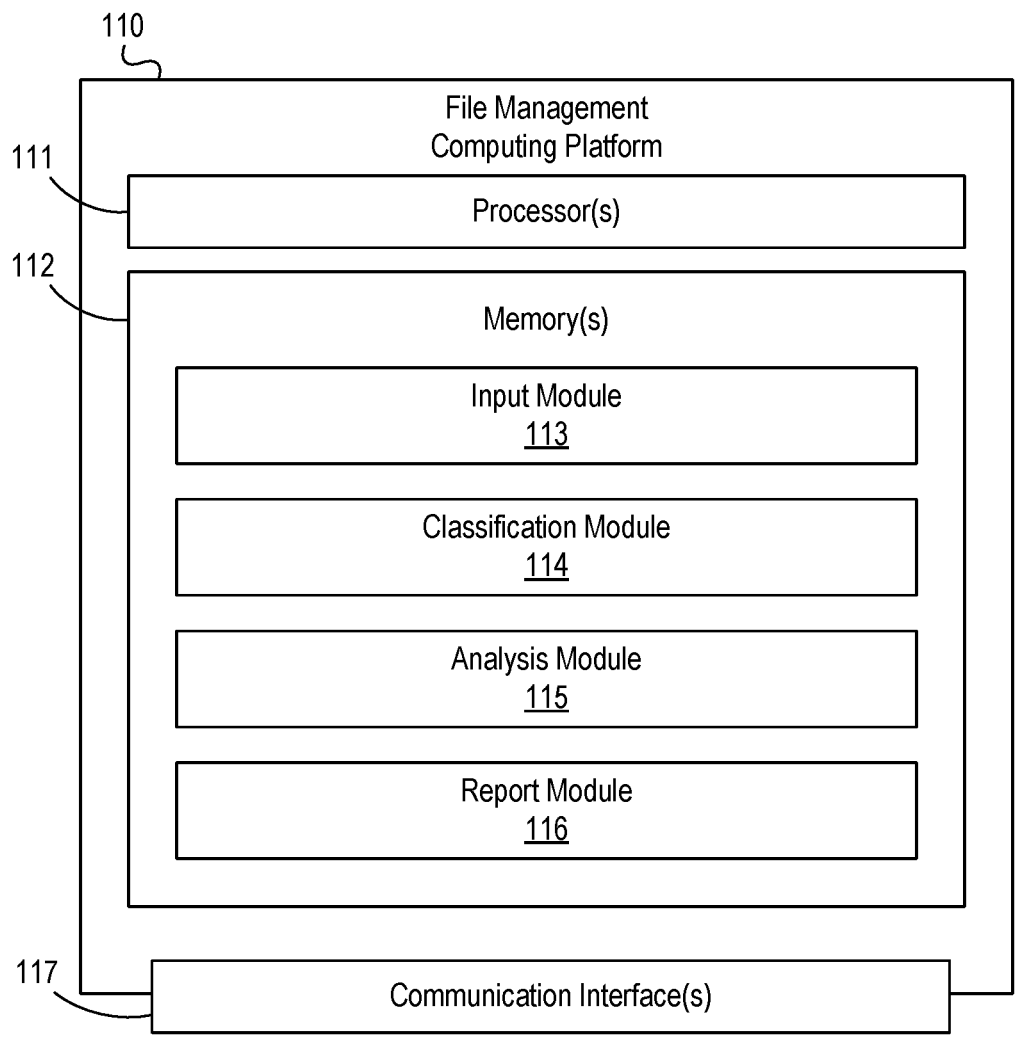
FIG. 1B depicts an illustrative computing environment for performing database file management using statistics maintenance and column similarity in accordance with one or more example embodiments.

FIGS. 1A and 1B depict an illustrative computing environment for performing database file management using statistics maintenance and column similarity in accordance with one or more example embodiments. Referring to FIG. 1A, computing environment 100 may include one or more computing devices. For example, computing environment 100 may include a file management computing platform 110, a client services computing platform 130, a first client computing device 160, a second client computing device 170, and a third client computing device 180.

File management computing platform 110 may be configured to receive information (e.g., photo information, video information, news information, balance information, transaction information, card information, profile information, or the like) related to one or more databases (which may, e.g., be databases of an organization), as illustrated in greater detail below. File management computing platform 110 may be configured to perform database file management using statistics maintenance and column similarity, as illustrated in greater detail below. File management computing platform 110 may, together with client services computing platform 130, enable an organization to provide enhanced services to customers and non-customers of an organization.

Client services computing platform 130 may be configured to identify one or more services that may be useful to customers or non-customers. Client services computing platform 130 may generate and/or send transmissions with information, details, and offers for providing the one or more services to customers or non-customers. For example, client services computing platform 130 may include and/or integrate with one or more client support servers and/or devices, such as one or more customer service representative devices used by one or more customer service representatives of an organization to connect one or more customers of the organization with one or more customer service representatives of the organization to provide additional information about the services available to the customers or non-customers.

Client computing device 160 may be configured to be used by a first customer of an organization, such as a financial institution. In some instances, client computing device 160 may, for example, be registered with the organization and/or one or more computer systems in computing environment 100, such that the organization and/or the one or more computer systems maintain one or more records linking client computing device 160 to the first customer of the organization, as illustrated in greater detail below. Client computing device 170 may be configured to be used by a second customer of the organization (who may, e.g., be different from the first customer of the organization). In some instances, client computing device 170 may, for example, be registered with the organization and/or one or more computer systems in computing environment 100, such that the organization and/or the one or more computer systems maintain one or more records linking client computing device 170 to the second customer of the organization, as illustrated in greater detail below. Client computing device 180 may be configured to be used by a third customer of the organization (who may, e.g., be different from the first customer of the organization and the second customer of the organization). In some instances, client computing device 180 may, for example, be registered with the organization and/or one or more computer systems in computing environment 100, such that the organization and/or the one or more computer systems maintain one or more records linking client computing device 180 to the third customer of the organization, as illustrated in greater detail below.

In one or more arrangements, file management computing platform 110, client services computing platform 130, client computing device 160, client computing device 170, and client computing device 180 may be any type of computing device capable of receiving a user interface, receiving input via the user interface, and communicating the received input to one or more other computing devices. For example, client services computing platform 130, client computing device 160, client computing device 170, and client computing device 180 may, in some instances, be and/or include server computers, server blades, desktop computers, laptop computers, tablet computers, smart phones, or the like that may include one or more processors, memories, communication interfaces, storage devices, and/or other components. As noted above, and as illustrated in greater detail below, any and/or all of client services computing platform 130, client computing device 160, client computing device 170, and client computing device 180 may, in some instances, be special-purpose computing devices configured to perform specific functions.

Computing environment 100 also may include one or more databases storing information that may be managed file management computing platform 110. For example, computing environment 100 may include one or more databases 135, which may be implemented in hardware or software. Computing environment 100 may include one or more processors, microprocessors, computers, microcomputers, circuits, and/or other hardware for gathering, storing, processing, converting, or otherwise enabling one or more databases 135 in computing environment 100.

Computing environment 100 also may include one or more networks, which may interconnect one or more of file management computing platform 110, client services computing platform 130, one or more databases 135, client computing device 160, client computing device 170, and client computing device 180. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, file management computing platform 110, and client services computing platform 130 may be associated with an organization (e.g., a financial institution), and private network 195 may be associated with and/or operated by the organization, and may include one or more networks (e.g., LANs, WANs, virtual private networks (VPNs), or the like) that interconnect file management computing platform 110, and client services computing platform 130 and one or more other computing devices and/or computer systems that are used by, operated by, and/or otherwise associated with the organization. Public network 190 may connect private network 195 and/or one or more computing devices connected thereto (e.g., file management computing platform 110, and client services computing platform 130) with one or more networks and/or computing devices that are not associated with the organization. For example, client computing device 160, client computing device 170, and client computing device 180 might not be associated with an organization that operates private network 195 (e.g., because client computing device 160, client computing device 170, and client computing device 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 160, client computing device 170, and client computing device 180 to private network 195 and/or one or more computing devices connected thereto (e.g., file management computing platform 110, client services computing platform 130).

Referring to FIG. 1B, file management computing platform 110 may include one or more processors 111, memory 112, and communication interface 117. A data bus may interconnect processor(s) 111, memory 112, and communication interface 117. Communication interface 117 may be a network interface configured to support communication between file management computing platform 110 and one or more networks (e.g., private network 195, public network 190, or the like). Memory 112 may include one or more program modules having instructions that when executed by processor(s) 111 cause file management computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of file management computing platform 110 and/or by different computing devices that may form and/or otherwise make up file management computing platform 110. For example, memory 112 may have, store, and/or include an input module 113, a classification module 114, an analysis module 115, and a report module 116.

Input module 113 may have instructions that direct and/or cause file management computing platform 110 to receive one or more input tables. For example, the file management computing platform may receive one or more tables related to a particular database or dataset from a particular database.

Classification module 114 may have instructions that direct and/or cause file management computing platform 110 to classify a column from the received one or more input tables into one of a plurality of pre-defined data types. The file management computing platform may calculate statistics for one or more of the columns. The file management computing platform may calculate the statistics for each of the one or more of the columns based on a data type of the each column. The file management computing platform may store the calculated statistics in a statistics file. The statistics file may be formatted according to a particular file scheme, such as JSON, XML, or the like.

The file management computing platform may update a repository of statistics with the statistics file. The repository of statistics may include statistics for historical data. For example, statistics may be stored for every minute, every hour, every 12 hours, daily, every other day, every third day, weekly, bi-weekly, monthly, bi-monthly, yearly, or the like.

Analysis module 115 may have instructions that direct and/or cause file management computing platform 110 to compare the calculated statistics with stored statistics of a most recent available historical table. The historical files may define limits for future files. The file management computing platform may generate one or more metric values based on the comparison of each statistic.

Metric values that may be monitored may include duplicate records, missing records, changing formats from data being moved across systems, a new category is added, an old category comes with a different form, a category is missing, a shift of records across categories, records pertaining to a particular timeframe (e.g., a certain month) go missing, a spurious amount in a data field, an item not present in a previous table but present in a current table and with an origination date older than a date of the previous table, or the like.

If a new statistic or metric is desired to be monitored, the new statistic or metric may be introduced before a next comparison. When the next comparison is performed, the new statistic or metric may be included in the comparison. The first analysis may establish a baseline for that new statistic or metric. Then, when future comparisons are performed, they may be compared against that established historical baseline. If differences are repeatedly found in future comparisons, the established baseline may be adjusted to reflect the differences (e.g., if an anomaly happened to exist in the first analysis, then future comparisons may be used to update the established baseline to correct for the initial anomaly).

The file management computing platform may check a position of a metric value in a prediction interval. The file management computing platform may generate a similarity score for each metric. Thus, the data analysis might not be based on determining a particular column of importance; all columns may be monitored for anomalies. Thus, the data analysis tool may be domain agnostic.

The file management computing platform may compute a table level similarity score. The file management computing platform may compute a column level similarity score.

The file management computing platform may determine if a metric breached a prediction interval. If the metric breached the prediction interval, the file management computing platform may determine whether the breach is problematic. If the breach is problematic, the file management computing platform may update a historical metrics table with new metrics and/or feedback. For example, the feedback may include information regarding whether a particular metric breached a prediction interval, and whether the breach is problematic.

The file management computing platform may provide a prediction interval for one or more metric values. For example, the file management computing platform may perform time series modeling to provide the prediction interval.

The file management computing platform may return in the process flow to checking the position of the metric value in the prediction interval, and repeat the process from there as described above.

The file management computing platform may analyze data while the data is stored on a native platform (e.g., platform-agnostic code or module(s) may perform the data analysis). In some embodiments, the data analysis may be performed without moving or replicating the data.

Report module 116 may have instructions that direct and/or cause file management computing platform 110 to generate a table-health report showcasing a health of the table. The table-health report may have a granularity that is a maximum granularity. Alternatively, the table-health report may have a granularity that is less than a maximum, such as a minimum granularity or a granularity that is above a minimum granularity but below a maximum granularity.

Figure 2A:
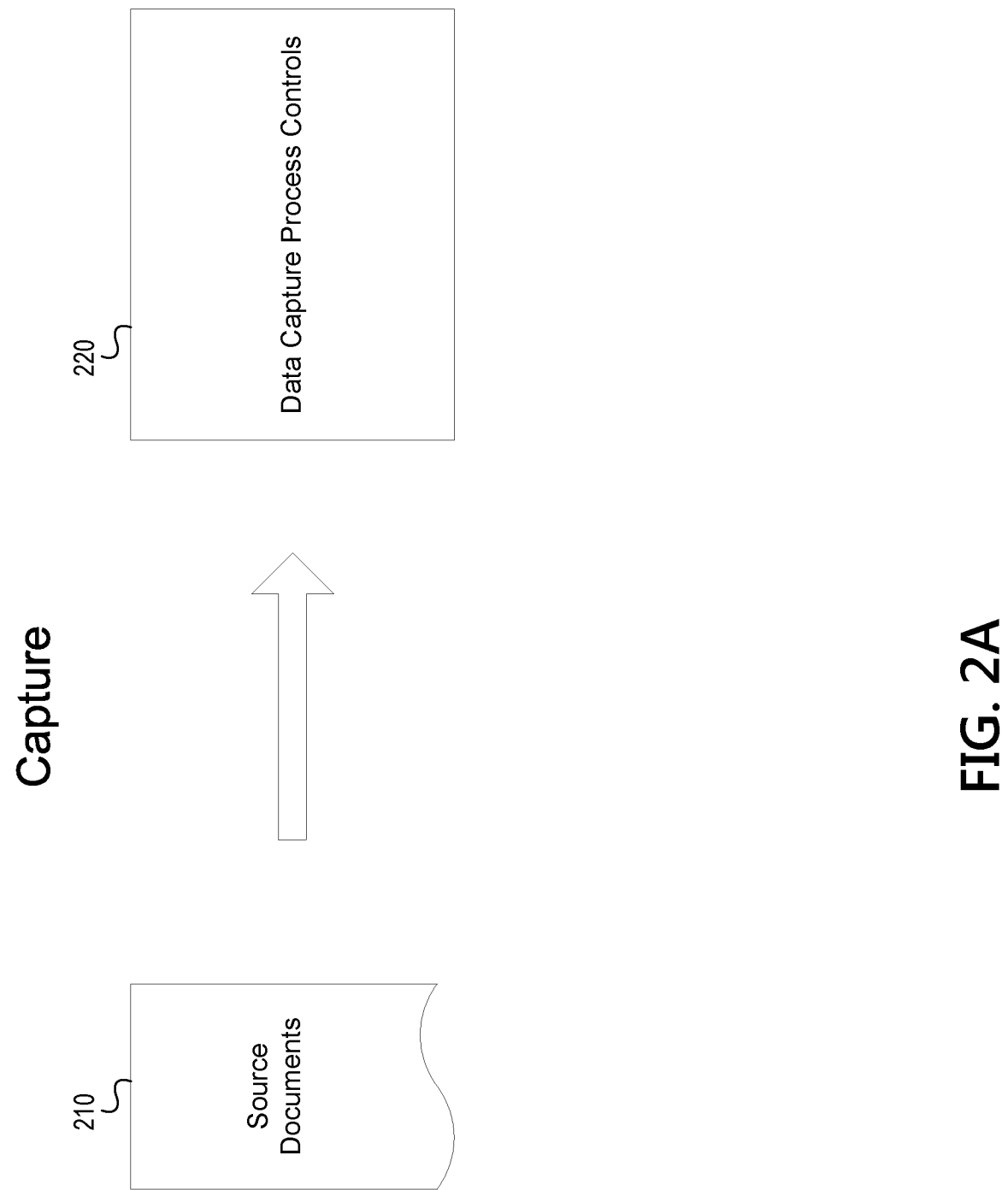
FIG. 2A depicts an illustrative capture portion of a data lifecycle in accordance with one or more example embodiments.
Figure 2B:
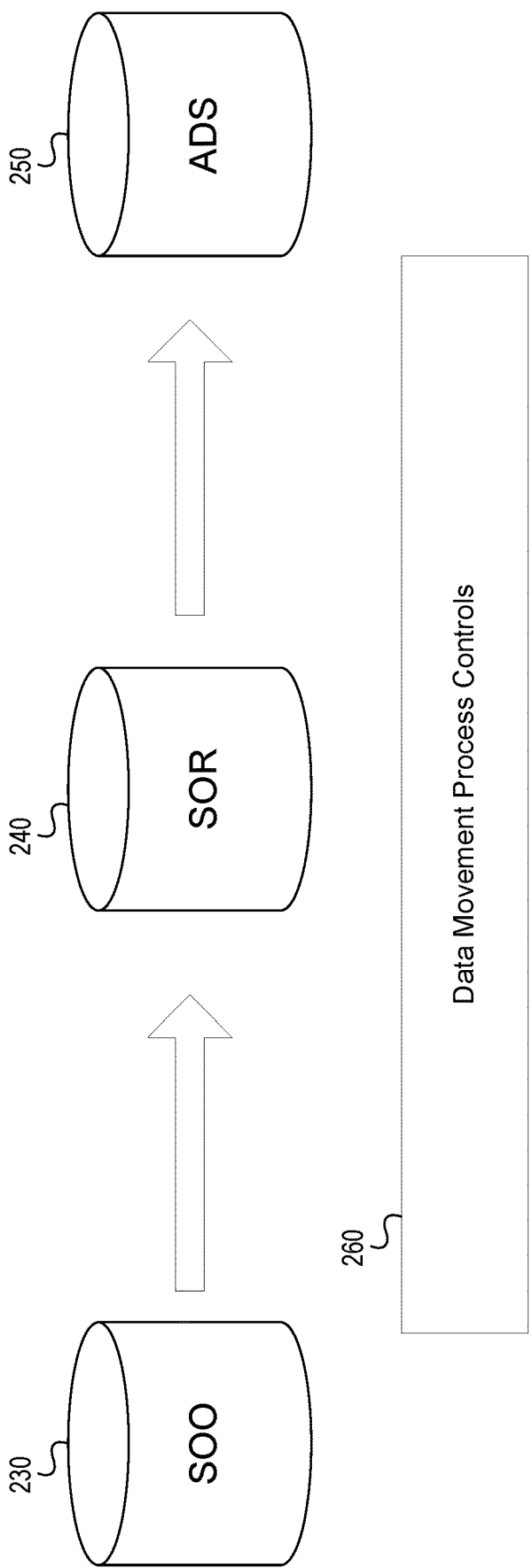
FIG. 2B depicts an illustrative transport portion of a data lifecycle in accordance with one or more example embodiments.

FIGS. 2A-2C depict one or more elements of an illustrative data lifecycle according to some embodiments. Controls for data accuracy may include basic, automated file-level checks by transport mechanisms and managed metrics that may be manually set by data owners at points of transformation, aggregation, and/or use. Maturity levels may vary for the accuracy controls. In some embodiments, there may be a lack of visibility or consistency across domains.

FIG. 2A depicts a capture phase of an illustrative data lifecycle. A system (e.g., file management computing platform 110) may capture information from one or more sources (e.g., source documents 210). The data may include metadata (e.g., data types, indices). The captured data may be for a time period (e.g., one day, two days, three days, one week, two weeks, 30 days, 60 days, three months, six months, one year, or the like). In one or more embodiments, the captured data may include documentation of known existing data quality defects.

The capture phase may be controlled by one or more data capture process controls 220. The capture phase may alternatively or additionally be controlled by one or more systemic field level edits.

FIG. 2B depicts an aggregation and/or transformation phase of an illustrative data lifecycle. This phase may include one or more areas, such as advantage database server (ADS) (e.g., deposits, card, customer, client, or the like) or data preparation spots (e.g., information products). This phase may include one or more controls (e.g., preventative controls, detective controls). Preventative controls may include system development life cycle (SDLC), change management controls, or the like. Detective controls (e.g., data movement process controls 260) may include inline accuracy tests with the majority engineered in the application. In one or more embodiments, detective controls may include use of reconnaissance services.

In one or more embodiments, data may be moved or replicated from a first location or database (e.g., system of origination (SOO) 230) to a second location or database (e.g., system of record (SOR) 240). In one or more embodiments, data may be moved or replicated from the second location (e.g., SOR 240) to a third location (e.g., ADS 250).

In one or more embodiments, data might not be moved or replicated. The data may sit on a native platform (e.g., database 135, SOO 230). The data capture tool may be platform agnostic (e.g., work with a number of different platforms). The data capture tool may capture information about the data, and/or determine statistics about the data, at the local device where the data is stored (e.g., database 135, SOO 230). The information and/or statistics about the data may be transferred, rather than the data itself being transferred. For example, information and/or statistics about data stored in SOO 230 may be transferred to SOR 240. The information and/or statistics about the data stored in SOO 230 may be transferred from SOR 240 to ADS 250. Transferring the information and/or statistics about the data, rather than the data itself, may provide for faster transfer times, improved data security, and/or faster data analytics, one or more of which may result in improved system performance.

FIG. 2C depicts a use phase of an illustrative data lifecycle. Data stored in a system (e.g., in database 135) may be used (e.g., accessed or requested by a web service, a customer, client services computing platform 130, or the like). Reports, analytics, and/or models (e.g., determined or generated by reporting, analytics, and/or modeling process controls 270) may be delivered and/or provided to end point asset 280 (e.g., a web service, a customer, client services computing platform 130, or the like).

FIGS. 3A-3D depict various phases of illustrative steps for a system (e.g., file management computing platform 110) to forecast data input and prepare accordingly. The approach may be designed to leverage existing work while limiting disruption to size the forecasting data sourcing and preparation opportunity through data analysis.

Figure 3A:
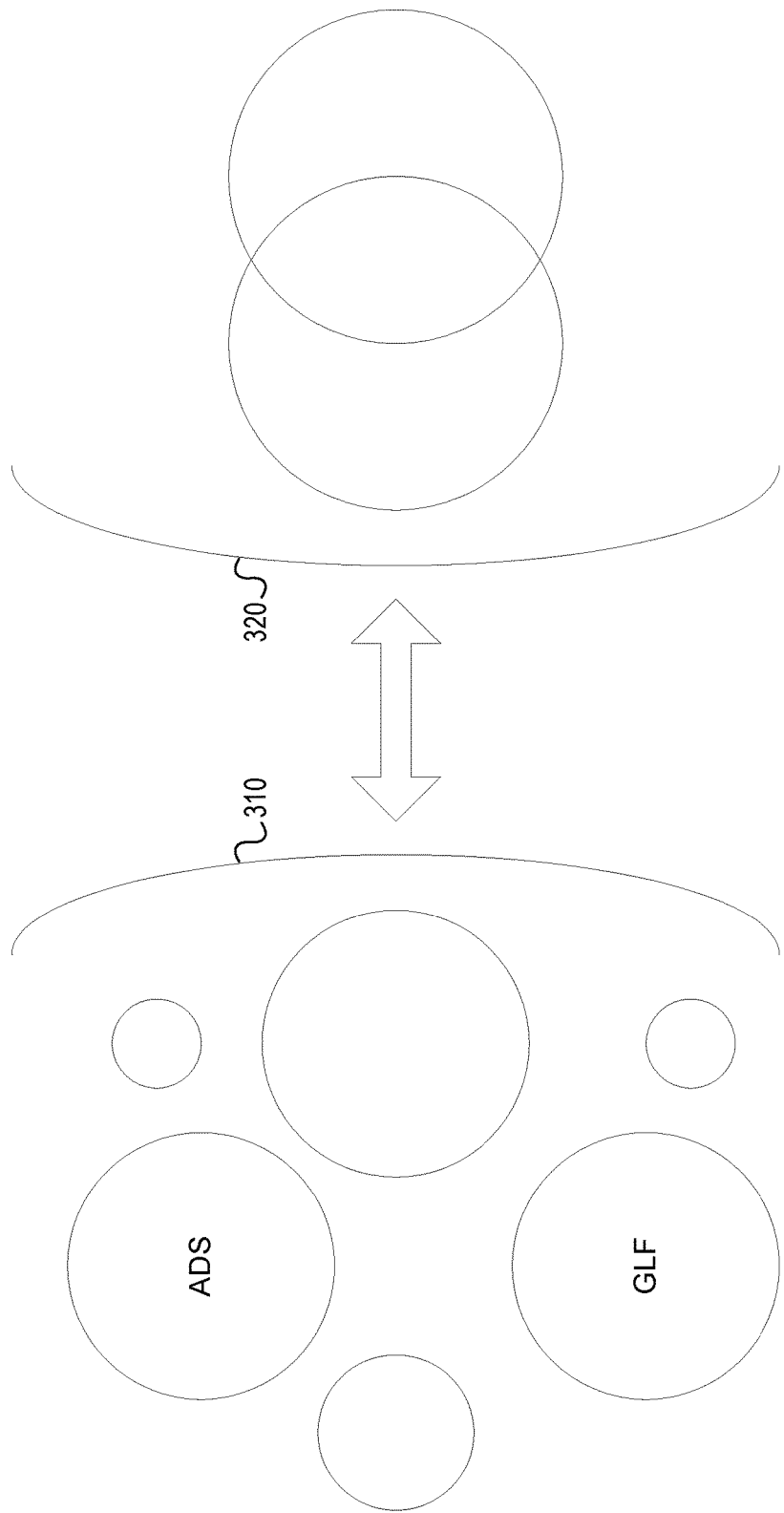
FIG. 3A depicts illustrative data gathering and comparison for performing database file management using statistics maintenance and column similarity in accordance with one or more example embodiments.

FIG. 3A depicts illustrative data sourcing and data preparation. Data gathering and comparison may be performed.

The system (e.g., file management computing platform 110) may obtain input files from one or more forecasting devices. Specifically, for example, the system may obtain input files from forecasting devices, and use the obtained files for ADS raw data versus input data for projections.

In one or more illustrative examples, the system may source (310) a data set and compare one or more files from the data set. The system may take the data to post-data preparation (320) and enter the data into a forecasting engine, such as file management computing platform 110.

Figure 3B:
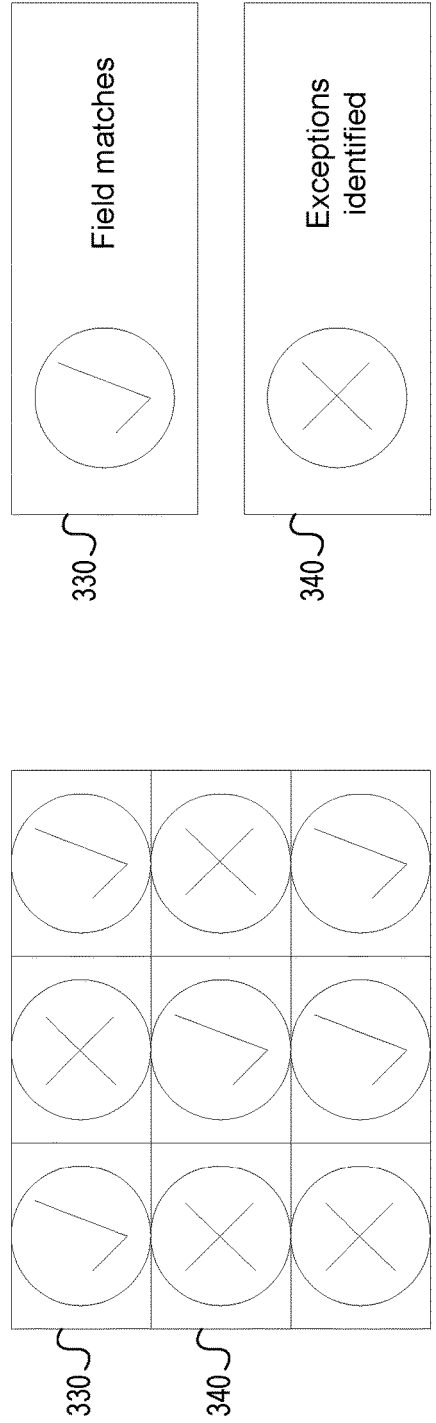
FIG. 3B depicts illustrative exception identification for performing database file management using statistics maintenance and column similarity in accordance with one or more example embodiments.

FIG. 3B depicts an illustrative exception identification. The system (e.g., file management computing platform 110) may identify data fields within a data set. The system (e.g., file management computing platform 110) may identify field matches. The system (e.g., file management computing platform 110) may compare data fields to highlight data matches (e.g., field matches 330). The system (e.g., file management computing platform 110) may identify exceptions (e.g., exceptions 340). The system (e.g., file management computing platform 110) may compare data fields to highlight identified exceptions. The system (e.g., file management computing platform 110) may identify common derivations.

FIG. 3C depicts an illustrative transformation analysis. The system (e.g., file management computing platform 110) may perform an analysis on transformation activity and categorize the activity into one or more categories. For example, the categories 350 may include one or more of enrichment, granularity, filtering, derivation, and/or the like. For example, in one or more aspects, the system (e.g., file management computing platform 110) may use a sample-based methodology to analyze exceptions and/or apply decision criteria. Specifically, in one or more aspects, based on the use of the sample-based methodology to analyze the exceptions and/or the application of the decision criteria, the system may highlight transformation activity, identify categorization, and/or make recommendations on alignment.

Figure 3D:
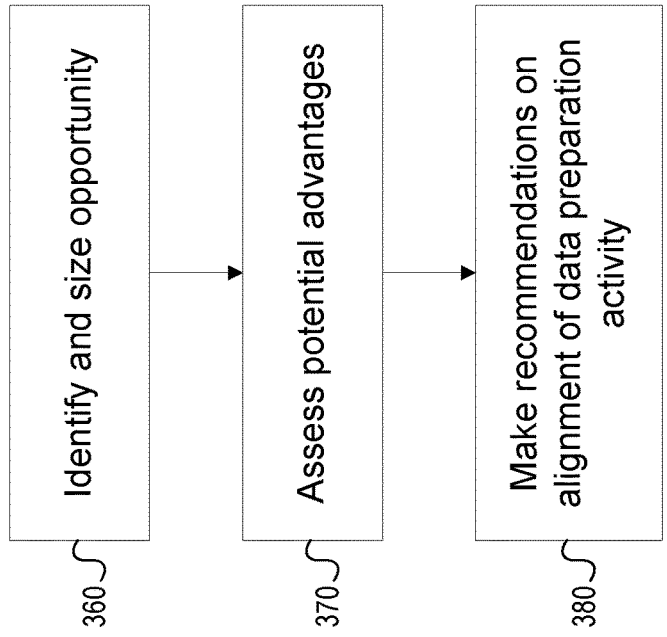
FIG. 3D depicts illustrative results evaluation for performing database file management using statistics maintenance and column similarity in accordance with one or more example embodiments.

FIG. 3D depicts an illustrative result evaluation. The system (e.g., file management computing platform 110) may aggregate one or more findings. The system (e.g., file management computing platform 110) may present the aggregated findings. Based on the aggregated findings, the system may identify and size opportunities 360. The system (e.g., file management computing platform 110) may assess potential advantages 370. The system (e.g., file management computing platform 110) may make recommendations on alignment of data preparation activity 380, program execution, or the like.

Figure 4:
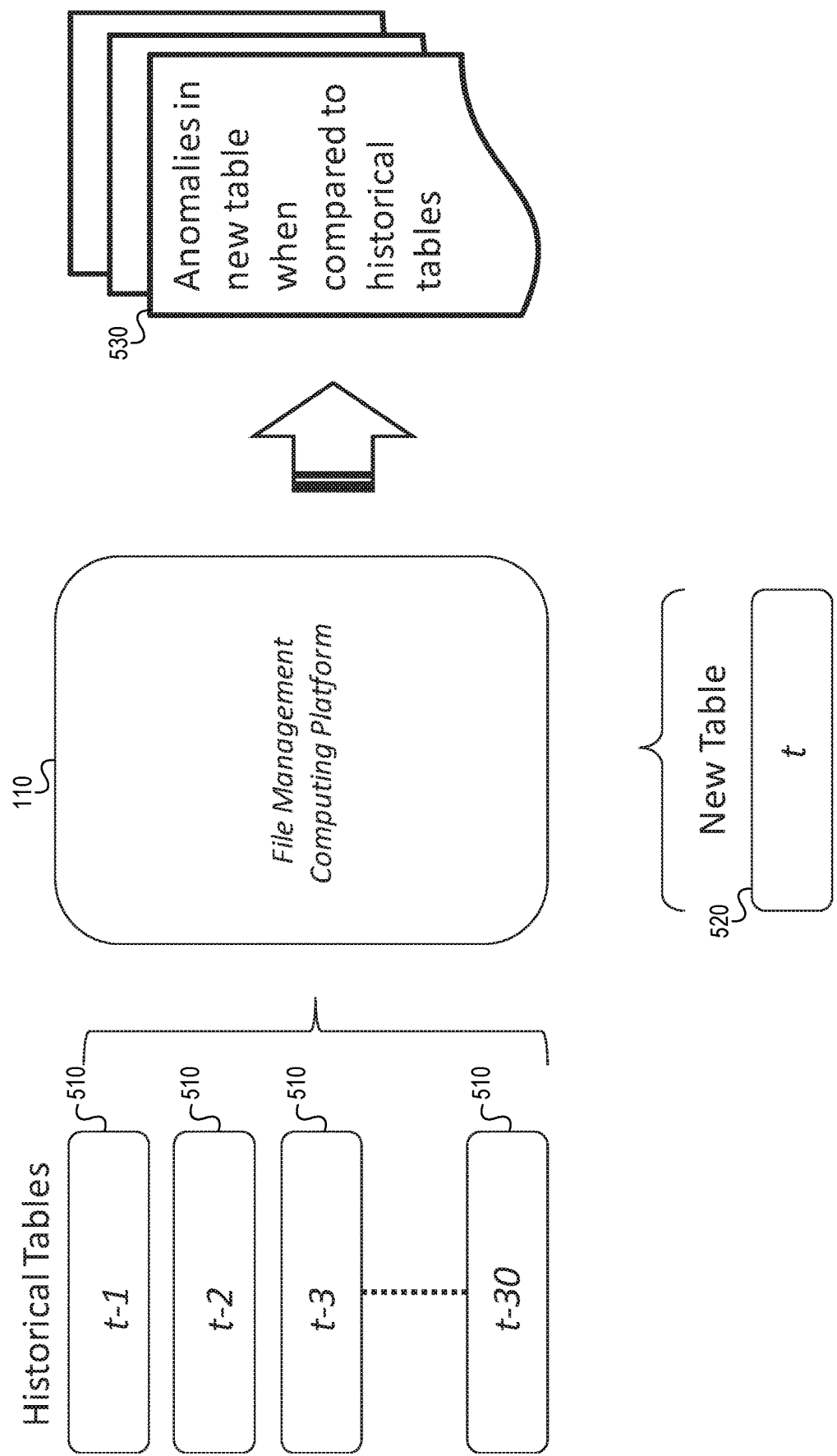
FIG. 4 depicts an illustrative flow diagram for performing database file management using statistics maintenance and column similarity in accordance with one or more example embodiments.

FIG. 4 depicts one or more illustrative systems for data accuracy monitoring. Data quality issues that may be addressed may include duplicate records, missing records, change of formats when data is moved across systems, when a new category is added, when an old category comes with a different form, if some category is missing, if some category comes with a different form, a shift of records across categories, records pertaining to a time period (e.g., a day, a week, a month, a year) missing from the data, a spurious balance amount, a significant number of accounts not present in a particular time period (e.g., last month) but not present in a different time period (e.g., the present), and/or an account origination date being older than the particular time period (e.g., more than one month old).

The file management computing platform 110 may perform similarity analysis across tables (e.g., in RDBMS) irrespective of platform (e.g., Teradata, SAS, SQL Server) and/or size (e.g., number of rows, number of columns) leveraging statistics of actual data within the tables. The file management computing platform 110 may work on the assumption that if two tables (or columns) are derived from same source (or one is subset of the other), underlying distribution of data within columns might not change significantly.

The file management computing platform 110 may include a framework to capture statistics pertaining to a column and compare them with columns from other tables to arrive at a similarity score (e.g., on a scale of 0-10). In some embodiments, the model parameters may be adjusted. The file management computing platform 110 may determine if two columns are similar with a threshold on similarity score.

The file management computing platform 110 may use different types of comparison methods based on data type of the column. A column may be one of a number of data types (e.g., date, index, character categorical, character non-categorical, numeric categorical, numeric non-categorical). In some embodiments, an aggregated similarity score may exist for one or more of the data types. For some data types, (e.g., character categorical, numeric categorical, numeric non-categorical) comparison of columns may happen at a more granular level (e.g., compare statistics pertaining to the distribution).

For one or more points of history (e.g., 30 days), for each column, the file management computing platform may check variation of the metrics (metrics may be aggregated similarity score of a column at time t1 with t2, or a metric at a more granular level like similarity score of Interquartile range of a column at time t1 with t2). The file management computing platform may assess if the variation of similarity score is within a threshold range for the one or more points of history.

When a new data point arrives, the file management computing platform may determine whether the new data point similarity score is within the variation (e.g., 95% of variation or control limits generated using time series modeling) of the one or more data points history. If the file management computing platform determines that the new data point is within the variation range of the one or more data points history, the file management computing platform may determine that the new data point is not anomalous data. If the file management computing platform determines that the new data point is not within the variation range of the one or more data points history, the file management computing platform may determine that the new data point is anomalous data. If the file management computing platform determines that the new data point is anomalous data, the file management computing platform may generate an alert (e.g., raise a flag, send a text message, send an short message service (SMS) message, send a multimedia message service (MMS) message, send an email, generate a web page popup, provide an alert on a smartphone application, send a smartphone notification, or the like).

After the file management computing platform obtains column level similarity score, the file management computing platform may aggregate individual scores. The file management computing platform may use the aggregated individual scores to derive the file level similarity score.

In one or more embodiments, some data types (e.g., index columns, character-categorical columns, addresses, and the like) might not have a probability distribution, and therefore might not be compared to other data within the particular column.

In one or more embodiments, when performing a column level comparison, the file management computing platform may treat each column in a table independently. In one or more embodiments, the file management computing platform may test dependency among columns to determine if the data between the columns is erroneous. For example, if a first column is state, and a second column is city, the file management computing platform may determine if the city is a valid city based on the state in the state column. For example, if the state is State1, and the city is City1, the file management computing platform may determine whether City1 is a city in the state of State1. Similarly, the file management computing platform may determine if the state is a valid state based on the city in the city column. For example, if the state is State1 and the city is City1, the file management computing platform may determine whether City1 is a city in the state of State1.

In one or more embodiments, the file management computing platform may, for a given snapshot, perform a check on a range of values within a column (e.g., determine if the range of values is within a threshold). For example, if a column correlates to an interest rate, and a value in the column is % A, the file management computing platform may determine that the interest rate is unreasonable (e.g., outside a threshold range) and determine that the value in the column is an anomaly. In one or more embodiments, the file management computing platform may determine whether a new data point (e.g., a new value added to a particular column) is erroneous based on a history of values within the column. For example, if the interest-rate column does not contain any values of % A or more, then the file management computing platform may determine that a new value of % A is an anomaly.

Figure 5:
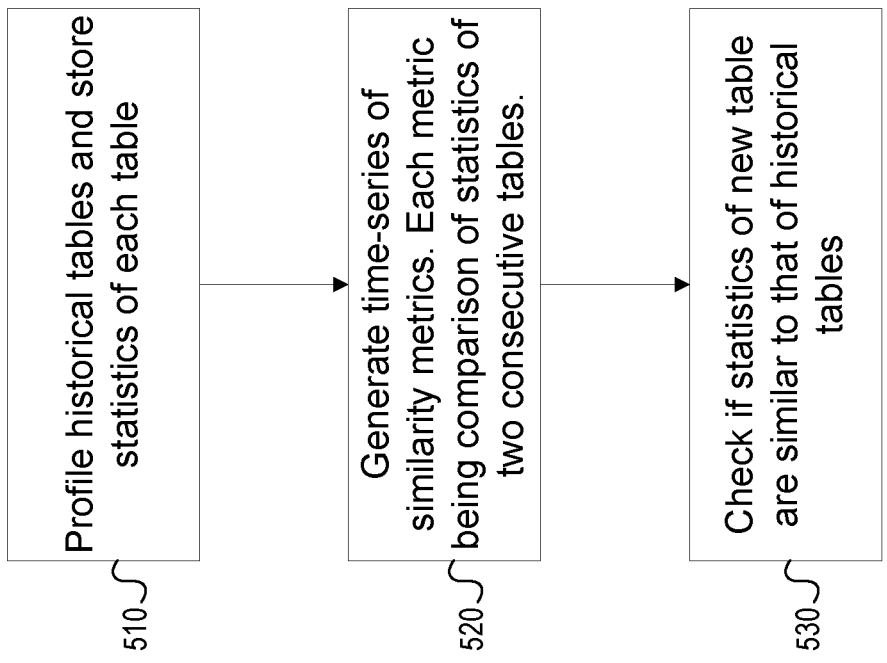
FIG. 5 depicts an illustrative process for performing database file management using statistics maintenance and column similarity in accordance with one or more example embodiments.

FIG. 5 depicts an illustrative flowchart of a method for performing database file management using statistics maintenance and column similarity. In step 510, the file management computing platform 110 may profile historical tables. In one or more embodiments, profiling the historical tables may include storing statistics of each of the historical tables. In step 520, the file management computing platform 110 may generate time-series of similarity metrics. In one or more embodiments, each metric may include a comparison of statistics of two consecutive tables. In step 530, the file management computing platform 110 may check if statistics of a new table are similar to that of historical tables.

Figure 6:
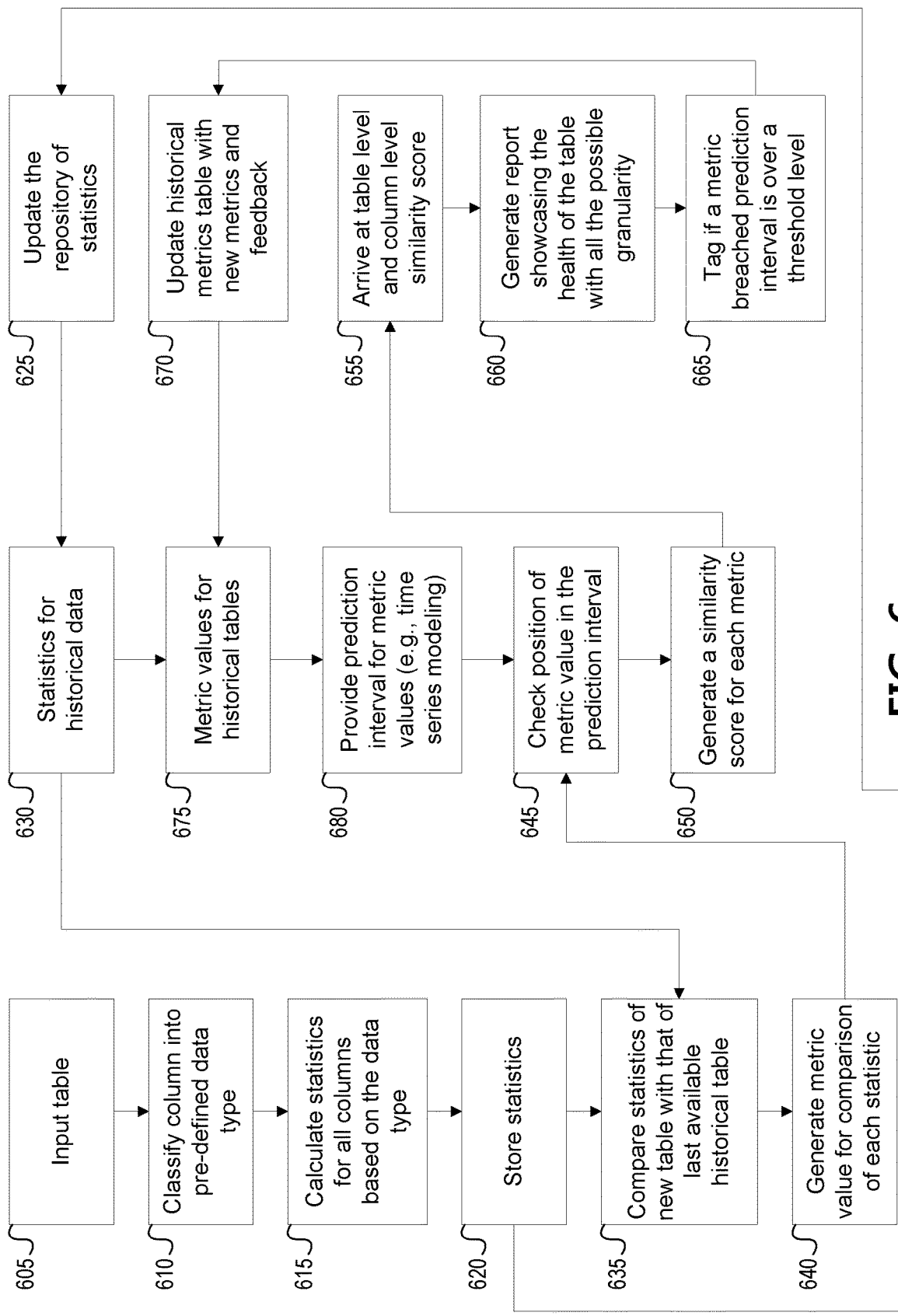
FIG. 6 depicts an illustrative flow diagram for performing database file management using statistics maintenance and column similarity in accordance with one or more example embodiments.

FIG. 6 depicts an illustrative flowchart of a method for performing database file management using statistics maintenance and column similarity.

In step 605, the system (e.g., file management computing platform 110) may receive an input table. In step 610, the system (e.g., file management computing platform 110) may classify a column into a pre-defined data type. In step 615, the system (e.g., file management computing platform 110) may calculate statistics for all columns based on the data type.

In step 620, the system (e.g., file management computing platform 110) may store statistics. In one or more embodiments, statistics may be stored in one or more files compatible with asynchronous browser-server communication (e.g., eXtensible Markup Language (XML), Asynchronous JavaScript And XML (AJAX), JavaScript, JavaScript Object Notation (JSON)).

In step 625, the system (e.g., file management computing platform 110) may update the repository of statistics. In step 630, the system (e.g., file management computing platform 110) may store statistics for historical data. In one or more embodiments, historical data may be stored in one or more files compatible with asynchronous browser-server communication (e.g., XML, AJAX, JavaScript, JSON).

In step 635, the system (e.g., file management computing platform 110) may compare statistics of the new table with that of last available historical table. The last historical table may be a most recent version or statistical snapshot of the historical records corresponding to the determined data type. The last historical table may be a most recent entry in the historical records corresponding to the determined data type.

In step 640, the system (e.g., file management computing platform 110) may generate metric value for comparison of each statistic. In step 645, the system (e.g., file management computing platform 110) may check position of metric value in the prediction interval. In step 650, the system (e.g., file management computing platform 110) may generate a similarity score for each metric. In step 655, the system (e.g., file management computing platform 110) may arrive at table level and/or column level similarity score. In one or more embodiments, the table level and/or column level similarity score may be determined using a weighting factor applied to one or more similarity scores for each metric.

In step 660, the system (e.g., file management computing platform 110) may generate a report showcasing the health of the table with all the possible granularity. In step 665, the system (e.g., file management computing platform 110) may tag if a metric breached prediction interval is over a threshold level.

In step 670, the system (e.g., file management computing platform 110) may update a historical metrics table with new metrics and feedback. In step 675, the system (e.g., file management computing platform 110) may determine metric values for historical tables. In step 680, the system (e.g., file management computing platform 110) may provide a prediction interval for metric values (e.g., using time series modeling).

FIGS. 7A-7B depict illustrative examples of various tables and columns associated with variables of different data types (e.g., categorical variable, numeric non-categorical variable).

FIG. 7A depicts an illustrative example of tables and columns associated with a categorical variable. Source column 705 may be a data column of a categorical variable data type. Target column 710 may be a data column of the categorical variable data type. Target column 710 may be a data column that is being analyzed relative to the source column 705.

The file management computing platform 110 may determine the total distinct values for data columns in the source column 705 and in the target column 710. The total distinct values may be the aggregated distinct values across the source column 705 and the target column 710.

The file management computing platform 110 may determine which values are overlapping values 720 between the source column 705 and the target column 710. The file management computing platform 110 may determine which values are unique values 725 to the source column 705. The file management computing platform 110 may determine which values are unique values 730 to the target column 710.

The file management computing platform 110 may compare statistics pertaining to distribution of the values of the source column 705 and the target column 710. The statistics may be determined based on the overlapping values 720 between the source column 705 and the target column 710.

For example, as depicted in FIG. 7A, the file management computing platform 110 may compare the overlapping values 720 (AA, BB, CC, EE) between the source column 705 and the target column 710. The file management computing platform 110 may determine a number of records in the target column 710 that include each value of the overlapping values 720. The file management computing platform 110 may determine a percentage of distribution of each value of the overlapping values 720 in the target column 710. The file management computing platform 110 may determine a number of records in the source column 705 that include each value of the overlapping values 720. The file management computing platform 110 may determine a percentage of distribution of each value of the overlapping values 720 in the source column 705. The file management computing platform may determine a weight of evidence of each value of the overlapping values 720. The file management computing platform may determine an IV value for each value of the overlapping values 720. The file management computing platform may determine an overall IV value for the target column 710 with the source column 705.

FIG. 7B depicts an illustrative example of tables and columns associated with a numeric non-categorical variable.

A table associated with a variable may include one or more columns. A first column (e.g., column 750) may include one or more identifiers (e.g., metric, column name similarity score, mean, mean score, standard deviation, standard deviation score, 5 percentile, 5 percentile score, 95 percentile, 95 percentile score, 25 percentile, 75 percentile, median, interquartile range score) of statistics data in associated rows of other columns.

A second column (e.g., column 760) may include data regarding statistics of a target variable (e.g., Target1). The target data source may be a column or table from a dataset. The target data source may have a particular data type. The target data source may be data associated with a particular individual (e.g., a user, a customer of an organization). The target data source may be data associated with a particular date or range of dates.

A third column (e.g., column 770) may include data regarding statistics of a source variable (e.g., Source1). The source data source may include one or more historical data values corresponding to the data type of the target data source.

The table may include statistics calculated based on the target variable and the source variable. For example, the calculated statistics may include a mean, a standard deviation, a 5 percentile, a 95 percentile, a 25 percentile, a 75 percentile, a median, or the like.

The table may include statistics similarity scores calculated based on comparing the target variable and the source variable. For example, the similarity scores may include a column name similarity score, a mean score, a standard deviation score, a 5 percentile score, a 95 percentile score, a 25 percentile score, a 75 percentile score, a median score, an interquartile range score, or the like.

A system (e.g., file management computing platform 110) may determine a total similarity score for a particular variable relative to the historical values. In one or more embodiments, the total similarity score may be weighted, so that one or more factors have more influence on the total similarity score, and that one more factors have less influence on total similarity score. Thus, a total similarity score may be calculated by multiplying a weighting factor by a determined similarity score.

For example, as depicted in FIG. 7B, a total similarity score (TotalScore1) may be determined by summing: a column name weighting factor (WeightFactor1) multiplied by a column name similarity score (Num1), a mean weighting factor (WeightFactor2) multiplied by a mean similarity score (Num4), a standard deviation weighting factor (WeightFactor3) multiplied by a standard deviation similarity score (Num7), a 5 percentile weighting factor (WeightFactor4) multiplied by a 5 percentile similarity score (Num10), a 95 percentile weighting factor (WeightFactor5) multiplied by a 95 percentile similarity score (Num13), and an interquartile range weighting factor (WeightFactor6) multiplied by an interquartile range similarity score (Num20).

Based on the determined similarity score, as described above, a system (e.g., file management computing platform 110) may determine whether the analyzed data includes anomalous data. The system may determine whether the analyzed data includes anomalous data based on whether the total similarity score is within a threshold range of similarity values. For example, if the total similarity score is within the threshold range of similarity values, then the system may determine that the analyzed data does not include anomalous data. If the total similarity score is not within the threshold range of similarity values, then the system may determine that the analyzed data does include anomalous data.

If the system determines that the analyzed data does include anomalous data, then the system may take one or more actions. The system may generate a flag for the table. The system may provide an indication of the anomalous table via a client services platform (e.g., client services computing platform 130). The system may send an alert to one or more devices (e.g., client computing device 160, client computing device 170, client computing device 180).

FIG. 8A depicts an illustrative graphical user interface for an alert of anomalous data in connection with one or more aspects described herein. After a file management computing platform (e.g., file management computing platform 110) determines that a data anomaly exists, the file management computing platform may generate a message that includes an alert regarding the data anomaly. The file management computing platform may send the message that includes the alert regarding the data anomaly to one or more remote computing devices (e.g., client computing device 160, client computing device 170), which may be associated with one or more users associated with the data in which the data anomaly was determined. For example, if a first user is associated with a first data set, and the file management computing platform determines that the first data set contains a data anomaly, the file management computing platform may send an alert to a computing device (e.g., client computing device 160) associated with the first user. In another example, if a second user is associated with a second data set, and the file management computing platform determines that the second data set contains a data anomaly, the file management computing platform may send an alert to a computing device (e.g., client computing device 170) associated with the second user.

FIG. 8B depicts an illustrative graphical user interface for an alert of anomalous data in connection with one or more aspects described herein. After a file management computing platform (e.g., file management computing platform 110) determines that a data anomaly exists, the file management computing platform may generate a message that includes an alert regarding the data anomaly. The file management computing platform may send the message that includes the alert regarding the data anomaly to one or more remote computing devices (e.g., client computing device 180), which may be associated with one or more administrators associated with an organization that stores, maintains, owns, or is otherwise associated with the data in which the data anomaly was determined. For example, if the file management computing platform determines that a column of a data set contains a data anomaly, the file management computing platform may send an alert to a computing device (e.g., client computing device 180) associated with the one or more administrators associated with the organization that stores, maintains, owns, or is otherwise associated with the data in which the data anomaly was determined.

The file management computing platform 110 may receive location data (e.g., latitude longitude, global positioning system (GPS) data, WiFi data, Global System for Mobile Communications (GSM) data) from one or more devices (e.g., client computing device 160, client computing device 170, client computing device 180). The file management computing platform 110 may determine a device to which to send an alert based on one or more factors (e.g., temporal, location). For example, if a time of day is within a first threshold range (e.g., 9:00 AM to 5:00 PM), the file management computing platform 110 may send an alert to a first device (e.g., an administrator device). If the time of day is within a second threshold range (e.g., 5:00 PM to 9:00 AM), the file management computing platform 110 may send an alert to a second device (e.g., a user device).

Similarly, if the location of a first device is a first location, the file management computing platform 110 may send an alert to the first device. If the location of the first device is a second location, the file management computing platform 110 may send an alert to a second device.

The file management computing platform 110 may send the alerts based on a combination of factors. For example, if a time of day is within a first threshold range (e.g., 9:00 AM to 5:00 PM), and if a location of a first device is a first location, the file management computing platform 110 may send an alert to the first device. If the time of day is not within the first threshold range or if the location of the first device is not the first location, the file management computing platform 110 may send an alert to a second device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   establish a communication link with a database;
   while the communication link is established, receive, from the database, an input table;
   classify a column of the received input table into a data type from a plurality of pre-defined data types;
   determine, based on the data type, a plurality of first statistics for the column of the received input table;
   store the plurality of first statistics for the column of the received input table in a repository of statistics;
   compare each of the plurality of first statistics for the column of the received input table to a corresponding second statistic of a plurality of second statistics for a column of a historical table, the historical table having the data type from the plurality of pre-defined data types;
   based on comparing each of the plurality of first statistics for the column of the received input table and the corresponding second statistic for the column of the historical table, generate a plurality of similarity scores of the column of the received input table to the column of the historical table;

determine, based on the plurality of similarity scores of the column, a total similarity score of the column to the column of the historical table;

determine whether the total similarity score of the column of the received input table to the column of the historical table is within a threshold similarity score range; and based on determining that the total similarity score of the column of the received input table to the column of the historical table is not within the threshold similarity score range:

tag the received input table as having the total similarity score of the column of the received input table to the column of the historical table that is not within the threshold similarity score range, and send, to a remote device, an alert that the received input table has the total similarity score of the column of the received input table to the column of the historical table that is not within the threshold similarity score range.

2. The computing platform of claim 1, wherein the memory stores additional computer-readable instructions that, when executed by the at least one processor, cause the computing platform to:

update the historical table having the data type from the plurality of pre-defined data types with new metrics determined from each of the plurality of first statistics for the column of the received input table.

3. The computing platform of claim 2, wherein the memory stores additional computer-readable instructions that, when executed by the at least one processor, cause the computing platform to:

determine a prediction interval for a metric corresponding to the column of the historical table.

4. The computing platform of claim 1, wherein the memory stores additional computer-readable instructions that, when executed by the at least one processor, cause the computing platform to:

generate a first metric value for the first statistic for the column of the received input table;

generate a second metric value for the second statistic for the column of the historical table; and determine a position of the second metric value for the second statistic for the column of the historical table in a prediction interval for a metric corresponding to the column of the historical table, wherein the metric comprises one of a duplicate record metric, a missing record metric, a changed format metric from data being moved across systems, an added new category metric, a different category form metric, a missing category metric, a shift of records across categories metric, a metric corresponding to records pertaining to a particular timeframe go missing, a spurious amount in a data field metric, and a metric corresponding to an item not present in a previous table but present in a current table and with an origination date older than a date of the previous table.

5. The computing platform of claim 4, wherein the memory stores additional computer-readable instructions that, when executed by the at least one processor, cause the computing platform to:

perform time-series modeling to provide the prediction interval for the metric corresponding to the column of the historical table.

6. The computing platform of claim 4, wherein the memory stores additional computer-readable instructions that, when executed by the at least one processor, cause the computing platform to:

determine a weighting factor for the first metric value for the first statistic for the column of the received input table;

use the weighting factor to determine a table level similarity score of the column of the received input table to the column of the historical table; and use the weighting factor to determine a column level similarity score of the column of the received input table to the column of the historical table.

7. The computing platform of claim 1, wherein storing each of the plurality of first statistics for the column of the received input table in the repository of statistics comprises storing each first statistic for the column of the received input table in the repository of statistics in a data format compatible with for asynchronous communication.

8. The computing platform of claim 7, wherein storing each of the plurality of first statistics for the column of the received input table in the repository of statistics in the data format compatible with for asynchronous communication comprises storing each first statistic for the column of the received input table in the repository of statistics in JavaScript Object Notation (JSON) format.

9. The computing platform of claim 1, wherein the plurality of pre-defined data types comprises a date data type, an index data type, a character categorical data type, a character non-categorical data type, a numeric categorical data type, and a numeric non-categorical data type.

10. The computing platform of claim 1, wherein generating the similarity score of the column of the received input table to the column of the historical table comprises generating a table level similarity score of the column of the received input table to the column of the historical table.

11. The computing platform of claim 1, wherein generating the similarity score of the column of the received input table to the column of the historical table comprises generating a column level similarity score of the column of the received input table to the column of the historical table.

12. The computing platform of claim 11, wherein the memory stores additional computer-readable instructions that, when executed by the at least one processor, cause the computing platform to:

generate a report comprising health of the column of the received input table.

13. The computing platform of claim 1, wherein the memory stores additional computer-readable instructions that, when executed by the at least one processor, cause the computing platform to:

receive location information for the remote device; and based on determining that the remote device is not in a first location, send, to a different remote device, the alert that the received input table has the similarity score of the column of the received input table to the column of the historical table that is not within the threshold similarity score range.

14. The computing platform of claim 1, wherein the memory stores additional computer-readable instructions that, when executed by the at least one processor, cause the computing platform to:

determine a time corresponding to receiving the input table; and based on determining that the time corresponding to receiving the input table is not within a threshold range of time, send, to a different remote device, the alert that the received input table has the similarity score of the column of the received input table to the column of the historical table that is not within the threshold similarity score range.

15. The computing platform of claim 1, wherein the alert that the received input table has the similarity score of the column of the received input table to the column of the historical table that is not within the threshold similarity score range causes the remote device to display a graphical user interface comprising the alert that the received input table has the similarity score of the column of the received input table to the column of the historical table that is not within the threshold similarity score range.

16. The computing platform of claim 1, wherein the memory stores additional computer-readable instructions that, when executed by the at least one processor, cause the computing platform to:
    aggregate a plurality of column level similarity scores for the column of the received input table; and
    based on the aggregated plurality of column level similarity scores for the column of the received input table, determine a file level similarity score for the received input table to the historical table.

17. The computing platform of claim 1, wherein the memory stores additional computer-readable instructions that, when executed by the at least one processor, cause the computing platform to:
    determine, based on whether the similarity score of the column of the received input table to the column of the historical table is within the threshold similarity score range, a recommendation for aligning the column of the received input table with the column of the historical table.

18. The computing platform of claim 1, wherein the memory stores additional computer-readable instructions that, when executed by the at least one processor, cause the computing platform to:
    establish a historical baseline for the second statistic for the column of the historical table,
    wherein determining whether the similarity score of the column of the received input table to the column of the historical table is within the threshold similarity score range comprises determining whether the similarity score of the column of the received input table to the column of the historical table is within the threshold similarity score range of the historical baseline for the second statistic for the column of the historical table.

19. A method, comprising:
    at a computing platform comprising at least one processor, memory, and a communication interface:
    establish a communication link with a database;
    while the communication link is established, receive, from the database, an input table;
    classify the received input table into a data type from a plurality of pre-defined data types;
    determine a first statistic and a second statistic for a column of the received input table;
    store the first statistic and the second statistic for the column of the received input table in a repository of statistics;
    compare each of the first statistic and the second statistic for the column of the received input table to a corresponding first statistic and second statistic for a column of a historical table, the historical table having the data type from the plurality of pre-defined data types;
    based on comparing the each of the first statistic and the second statistic for the column of the received input table and the corresponding first statistic and the second statistic for the column of the historical table, generate a similarity score corresponding to each of the first statistic and the second statistic of the column of the received input table to the column of the historical table;
    determine whether the similarity score corresponding to the first statistic or the similarity score corresponding to the second statistic of the column of the received input table to the column of the historical table is within a threshold similarity score range; and
    based on determining that the similarity score corresponding to the first statistic or the similarity score corresponding to the second statistic of the column of the received input table to the column of the historical table is not within the threshold similarity score range:
    tag the received input table as having the similarity score corresponding to the first statistic or the similarity score corresponding to the second statistic of the column of the received input table to the column of the historical table that is not within the threshold similarity score range, and
    send, to a remote device, an alert that the received input table has the similarity score corresponding to the first statistic or the similarity score corresponding to the second statistic of the column of the received input table to the column of the historical table that is not within the threshold similarity score range.

20. One or more non-transitory computer-readable media storing instructions that, when executed by a computing platform comprising at least one processor, memory, and a communication interface, cause the computing platform to:
    establish a communication link with a database;
    while the communication link is established, receive, from the database, an input table;
    classify the received input table into a data type from a plurality of pre-defined data types;
    determine a first statistic and a second statistic for a column of the received input table;
    store the first statistic and the second statistic for the column of the received input table in a repository of statistics;
    compare the first statistic and the second statistic for the column of the received input table to a corresponding first statistic and second statistic for a column of a historical table, the historical table having the data type from the plurality of pre-defined data types;
    based on comparing the first statistic and the second statistic for the column of the received input table and the corresponding first statistic and the second statistic for the column of the historical table, generate a similarity score corresponding to the first statistic or the similarity score corresponding to the second statistic of the column of the received input table to the column of the historical table;
    determine whether the similarity score corresponding to the first statistic or the similarity score corresponding to the second statistic of the column of the received input table to the column of the historical table is within a threshold similarity score range; and
    based on determining that the similarity score corresponding to the first statistic or the similarity score corresponding to the second statistic of the column of the received input table to the column of the historical table is not within the threshold similarity score range:
tag the received input table as having the similarity score corresponding to the first statistic or the similarity score corresponding to the second statistic of the column of the received input table to the column of the historical table that is not within the threshold similarity score range, and
send, to a remote device, an alert that the received input table has the similarity score corresponding to the first statistic or the similarity score corresponding to the second statistic of the column of the received input table to the column of the historical table that is not within the threshold similarity score range.

* * * * *